United States Patent
Smith et al.

(10) Patent No.: US 8,554,190 B2
(45) Date of Patent: Oct. 8, 2013

(54) MOBILE APPLICATION SYSTEM

(75) Inventors: Charles Eric Smith, Austin, TX (US); Roy Stacey Zuniga, Austin, TX (US); James Edward Butcher, Round Rock, TX (US); Jonathon Robert Lee, Austin, TX (US)

(73) Assignee: Unwired Nation, Inc., Austin, TX (US)

( * ) Notice: Subject to any disclaimer, the term of this patent is extended or adjusted under 35 U.S.C. 154(b) by 78 days.

(21) Appl. No.: 13/165,485

(22) Filed: Jun. 21, 2011

(65) Prior Publication Data

US 2012/0220263 A1  Aug. 30, 2012

Related U.S. Application Data

(60) Provisional application No. 61/447,474, filed on Feb. 28, 2011.

(51) Int. Cl.
  *H04M 3/42* (2006.01)
(52) U.S. Cl.
  USPC ............... 455/418; 455/414.1; 455/550.1; 709/203
(58) Field of Classification Search
  USPC ............... 455/418, 414.1, 550.1; 709/203
  See application file for complete search history.

(56) References Cited

U.S. PATENT DOCUMENTS

| | | | |
|---|---|---|---|
| 2005/0209930 A1* | 9/2005 | Coppinger et al. | 705/26 |
| 2006/0129972 A1* | 6/2006 | Tyburski et al. | 717/106 |
| 2009/0043700 A1* | 2/2009 | Coppinger et al. | 705/40 |
| 2012/0154117 A1* | 6/2012 | Nice et al. | 340/5.82 |

OTHER PUBLICATIONS

"Case Studies: It's a GoodDay for a PhoneGap App," Nitobi, <http:www.phonegap.com/case_study/it%E2%80%99s-a-good-day-for-a-phonegap-app/>, printed Feb. 28, 2011, 2 pages.
"About: How PhoneGap Works," Nitobi, <http://www.phonegap.com/about>, printed Feb. 28, 2011, 2 pages.
Jolie O'Dell, "5 Cross-Platform Mobile Development Tools You Should Try," Rackspace Hosting, <http://mashable.com/2010/08/11/cross-platform-mobile-development-tools/>, dated Aug. 11, 2010, printed Feb. 28, 2011, 13 pages.
Kony Solutions, "No limitations. Kony Mobile Application Development Platform," Kony, <http://www.kony.com/platform/>, printed Feb. 28, 2011, 6 pages.
Kony Solutions, "Agility. Without compromises." Kony, <http://www.kony.com/platform/write-once-run-everywhere/>, printed Feb. 28, 2011, 6 pages.

* cited by examiner

*Primary Examiner* — Danh Le
(74) *Attorney, Agent, or Firm* — Toler Law Group, PC

(57) ABSTRACT

A particular method includes accessing a webpage at a web server from a mobile application executing at a mobile device. A mobile application tag may be identified in the webpage, where the mobile application tag is independent of a device type of the mobile device. The method also includes determining that the mobile application tag corresponds to a native device function of the mobile device and accessing the native device function.

20 Claims, 6 Drawing Sheets

MOBILE APPLICATION SYSTEM

CLAIM OF PRIORITY

The present application claims priority from U.S. Provisional Patent Application No. 61/447,474, filed on Feb. 28, 2011, the content of which is incorporated herein by reference in its entirety.

BACKGROUND

Recent years have seen widespread adoption of Internet technology. To leverage the capabilities of the Internet, many businesses have established Internet presences such as websites and web applications. Recent years have also seen widespread adoption of mobile phones, including mobile phones that enable users to browse the Internet. However, due to hardware, software, and bandwidth limitations of mobile phones, websites and web applications that are functional on personal computers may not function correctly or may function with limited capabilities on mobile phones. Thus, some businesses offer "mobile versions" of their websites or downloadable mobile applications that can be installed and executed on mobile phones.

However, developing such mobile websites and applications can be cumbersome. There may be a large number of mobile platforms (e.g., combination of hardware, software, operating system, and wireless network provider) for users to choose from when purchasing a mobile phone. In addition, multiple versions of a mobile platform may be active at any time, and each platform may have different release and update schedules. Due to the differences in mobile platforms, a business that wishes to provide mobile application functionality may need to assign dedicated development resources for each mobile platform (e.g., a dedicated software development team responsible for maintaining and updating a platform-specific mobile application). However, the cost of maintaining dedicated development resources and codebases for multiple mobile platforms increases with each new mobile platform and with updates to such platforms.

SUMMARY

Systems and methods of mobile application development and execution are disclosed. One disclosed technique provides platform-as-a-service (PaaS) that is capable of abstracting platform-specific details. For example, instead of creating dedicated mobile applications for each mobile platform, a PaaS provider may enable customers to deploy existing platform-agnostic web applications (e.g., web applications that are accessible to the PaaS) to multiple mobile platforms at once. The PaaS provider may provide bridging functions to natively execute web application code on each of the mobile platforms. Thus, the customer may focus on developing and deploying platform-agnostic functionality on the customer's desired release schedule (instead of multiple platform-driven schedules) and rely on the PaaS provider to provide the technology and services to "mobilize" such functionality in a manner compatible with the intricacies of each individual mobile platform.

In one example, the customer may prepare an existing web application for mobile deployment by a PaaS provider by creating mobile layout definitions (e.g., cascading style sheets (CSS)). The PaaS provider may create customized mobile applications for each desired mobile platform based on the mobile layout definitions. The customized mobile applications (which may also be referred to as "PaaS-powered" applications) may be provided to users as downloadable content on each of the mobile platforms. When a user executes the downloaded application on their mobile phone, the user may provide sign-in information that corresponds to a unique identifier (UID) for the user. The UID may enable push notifications and messages to be sent to the mobile phone. Moreover, each mobile operating system may render the push notification in a native visual style.

The use of PaaS may also enable customers to deploy new functionality to the previously installed PaaS-powered mobile application without requiring an update or reinstallation of the PaaS-powered mobile application. In one implementation, the customer may tag interface elements of existing web applications. For example, hypertext markup language (HTML) elements may be tagged using javascript. When the PaaS-powered mobile application encounters the tags, the PaaS-powered application may interpret the tags to access platform-specific functionality, such as a camera or a global position system (GPS) transceiver. The disclosed techniques may thus provide developers access to platform-specific functionality on various mobile devices without pre-compilation of tags into a mobile application and without use of native binaries to translate between the tags and platform-specific native mobile code. In addition, since such tags exist on just the customer-side web application and not within the PaaS-powered mobile application, the customer may dynamically add, remove, and edit the tag-based functions independently of any deployed mobile platforms.

DETAILED DESCRIPTION

In a particular embodiment, a method includes receiving sign-in information from a mobile device and assigning a unique identifier to the mobile device. The method also includes storing an association of the unique identifier, the sign-in information, and a device type of the mobile device. The method further includes receiving a request from a web server to transmit a message to the mobile device, where the request includes the unique identifier associated with the mobile device and where the request is independent of the device type of the mobile device. The method includes sending the message to the mobile device.

In another particular embodiment, a computer system includes a processor and a memory coupled to the processor. The memory stores instructions executable by the processor to receive a unique identifier and a device type associated with the mobile device from a second computer system. The instructions are further executable to send a request to the second computer system to transmit a message to the mobile device, where the request includes the unique identifier, and where the request is independent of the device type of the mobile device. The instructions are executable to detect that the message is delivered to the mobile device.

In another particular embodiment, non-transitory processor-readable medium includes instructions that, when executed by a processor, cause the processor to access a webpage at a web server from a mobile application executing from a mobile device. The instructions are also executable to identify a mobile application tag in the webpage, where the mobile application tag is independent of a device type of the mobile device. The instructions are further executable to determine that the mobile application tag corresponds to a native device function of the mobile device and to access the native device function of the mobile device.

Figure 1:
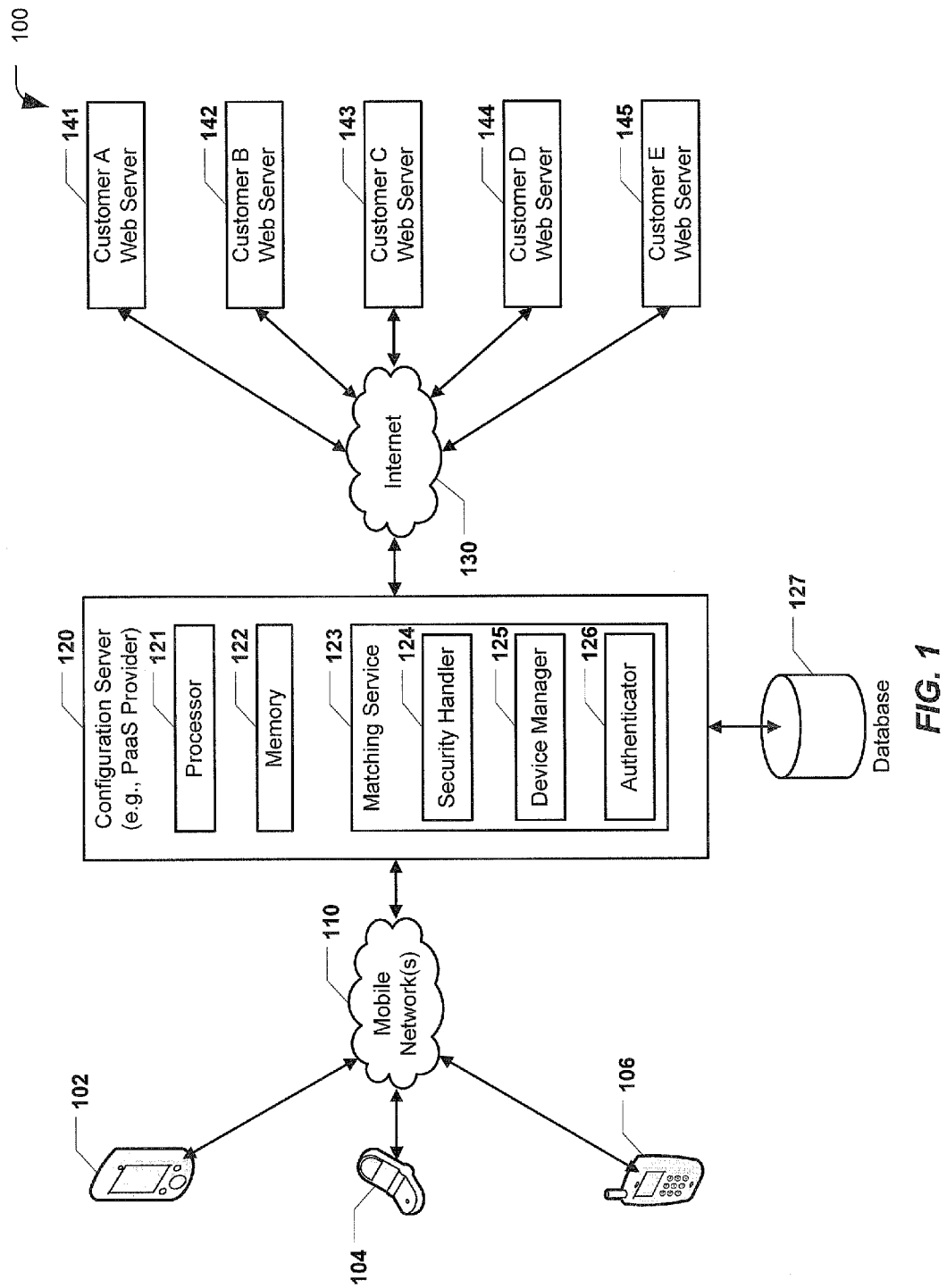
FIG. 1 is a diagram to illustrate a particular embodiment of a system to provide mobile applications to multiple mobile platforms.

FIG. 1 is a diagram to illustrate a particular embodiment of a system 100 to make mobile applications available for deployment to multiple mobile platforms. The system includes a configuration server 120 communicatively coupled to a plurality of mobile devices (e.g., illustrative mobile devices 102, 104, and 106) and to a plurality of web servers (e.g., illustrative customer web servers 141, 142, 143, 144, and 145). It should be noted that as used herein, the term "customer" may generally refer to enterprises or business entities that contract with a provider (e.g., a PaaS provider) of the systems and methods disclosed herein to provide cross-platform mobile applications and services. Alternately, a PaaS provider may white-label or license the PaaS technology to resellers that contract with customers. For example, resellers may provide custom solutions for end-customers based on the PaaS offering or may integrate directly with the PaaS provider to power their existing products for sale, as an independent software vendor (ISV).

The mobile devices 102-106 may include a mobile telephone, a smartphone, a touchscreen computing device, a portable media player, some other mobile device, or any combination thereof. In addition, the mobile devices 102-106 may include different mobile platforms and may operate on different mobile networks 110. For example, mobile platforms may include operating systems such as webOS™ (by Palm, Inc., which is a subsidiary of Hewlett-Packard Co. of Palo Alto, Calif., USA), BlackBerry® OS (by Research in Motion Ltd. of Waterloo, Ontario, Canada), iOS (by Apple Inc. of Cupertino, Calif., USA), Windows® Phone 7 (by Microsoft Corp. of Redmond, Wash., USA), and Android™ (by Google Inc. of Mountain View, Calif., USA). The mobile platforms of the mobile devices 102-106 may also include different hardware and application software configurations.

The configuration server 120 may include a processor 121 and a memory 122. In a particular embodiment, the configuration server 120 is maintained by a PaaS provider. The configuration server 120 may also execute a matching service 123 (e.g., as a web service). The matching service 123 may facilitate communication between the mobile devices 102-106 and the web servers 141-145. For example, the matching service 123 may include a security handler 124 to implement security and encryption protocols, a device manager 125 to track information and data pertaining to the mobile devices 102-106 (e.g., in a database 27), and an authenticator 126 to validate sign-in information provided by the mobile devices 102-106.

Each of the web servers 141-145 may be associated with a different customer and may host websites and web applications that are accessible via the Internet 130. For example, Customer A's web server 141 may host Customer A's website (e.g., www.customera.com) and web applications (e.g., an application to buy products sold by Customer A). To expand into mobile sales, Customer A may contract with a PaaS provider (e.g., by subscribing to PaaS services), where the PaaS provider deploys mobile application functionality to the mobile devices 102-106 as disclosed herein.

For example, when the mobile device 102 accesses the Customer A web server 141, the configuration server 120 may receive sign-in information from the mobile device 102. In an illustrative embodiment, the sign-in information is provided by a mobile application executing on the mobile device 102, where the mobile application is a PaaS-powered mobile application that is generated based on customized layouts. PaaS-powered mobile applications and customized layouts are further described with reference to FIGS. 2-3. The sign-in information may include a user name, a password, and device identification information (e.g., a media access control (MAC) address). The sign-in information may also include a device type and other platform-specific information regarding the mobile device 102.

The matching service 123 may assign a unique identifier (UID) to the mobile device 102 and may store an association of the UID, sign-in information, and the device type in the database 127. The matching service 123 may transmit the UID and the device type to the Customer A web server 141, which uses the UID and the device type to select an appropriate (e.g., platform-specific) mobile website interface that is served to the mobile device 102. In a particular embodiment, the mobile website interface serves as a customized entry point to the same website and web application functionality that the Customer A web server 141 provides to desktop and laptop computer systems. The Customer A web server 141 may also send (e.g., push) messages to the mobile device 102, as further described with reference to FIG. 2.

The matching service 123 may be a centralized directory of all of the device information used to route messages and information to end users on multiple, heterogeneous networks, including unique application and/or user ID credentials for customers. This may enable customers to present a single globally unique identifier (GUID) to the PaaS web service, which may then be routed to an end-user's active devices independent of the end user's network or device type.

Figure 2:
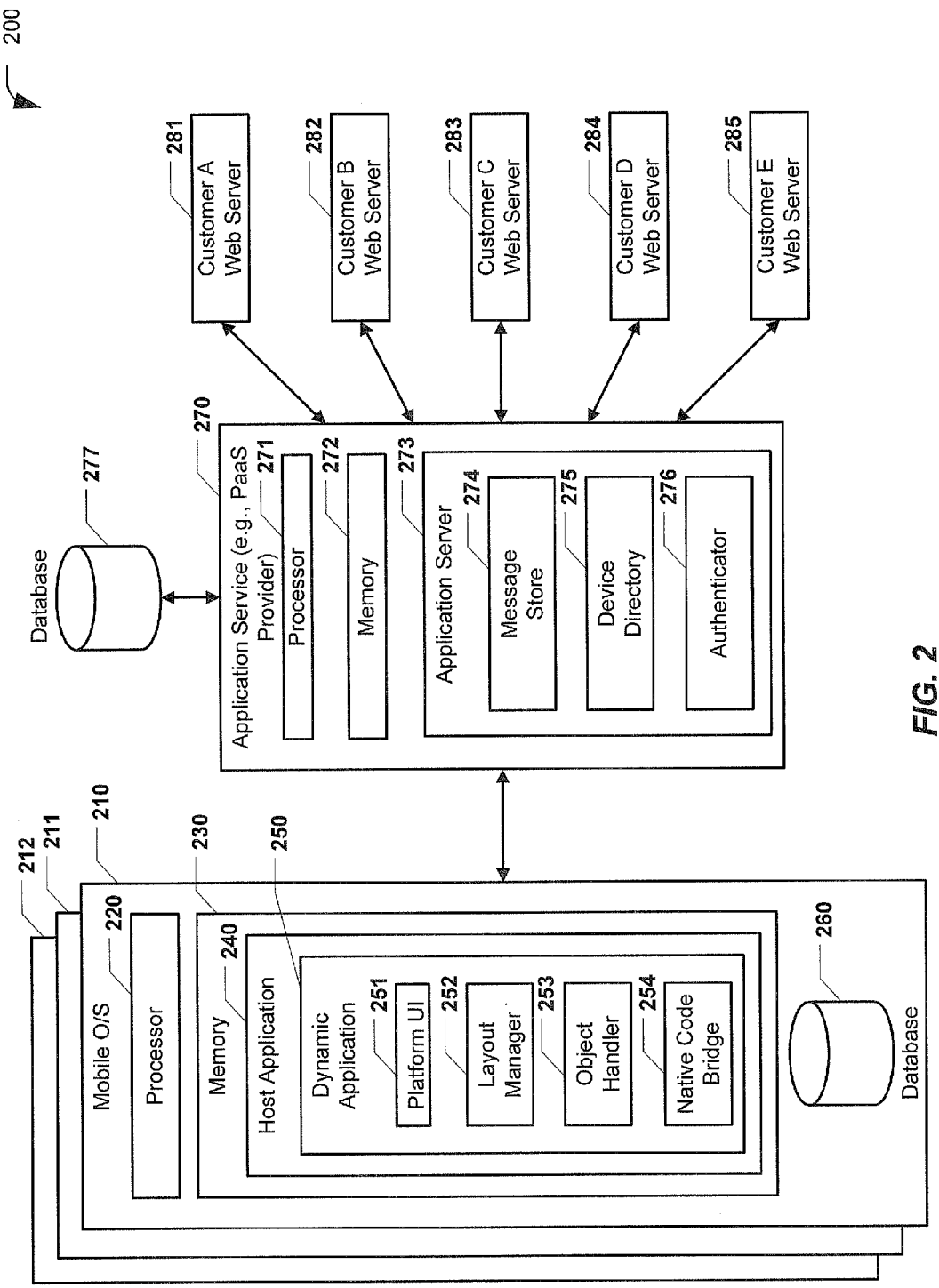
FIG. 2 is a diagram to illustrate another particular embodiment of a system to provide mobile applications to multiple mobile platforms.

FIG. 2 is a diagram to illustrate another particular embodiment of a system 200 to provide mobile applications to multiple mobile platforms. The system 200 includes an application service 270 communicatively coupled to a plurality of web servers 281-285 and to a plurality of mobile devices (e.g., executing illustrative mobile operating systems 210, 211, and 212).

In an illustrative embodiment, the application service 270 executes on the configuration server 120 of FIG. 1. The application service 270 may execute at a PaaS provider computer system that includes a processor 271 and a memory 272. The application service 270 may provide access to an application server 273. The application server 273 may enable the web servers 281-285 to push messages and notifications to the mobile devices associated with the mobile operating systems 210-212. For example, the application server 273 may include a message store 274 to store past, current, and future messages, a device directory 275 to store data and information pertaining to the mobile devices (e.g., in a database 277), and an authenticator 276 (e.g., similar to the authenticator 126 of FIG. 1).

In a particular embodiment, the web applications and websites provided by the web servers 281-285 are platform-agnostic and not configured for mobile access. For example, hardware, software, and bandwidth limitations of mobile devices may cause errors or improper functionality when the websites and web applications are accessed from the mobile device. To provide mobile access to the websites and web applications at reduced development cost, the customers associated with the web servers 281-285 may generate customized mobile layouts (e.g., cascaded style sheets (CSS)) corresponding to each of the various mobile platforms they wish to support. A PaaS provider may compile customized mobile applications for each mobile platform based on the customized CSS and may upload the resulting PaaS-powered customized mobile applications to the native marketplaces or application storefronts of the various mobile platforms. Users may download and install the customized mobile applications to their mobile devices.

For example, a mobile device executing the mobile operating system 210 may include a processor 220 and a memory 230. The memory 230 may execute a host application 240 that includes a dynamic application 250. In a particular embodiment, one or more of the host application 240 and the dynamic application 250 correspond to the PaaS-powered mobile application generated based on the customized CSS and downloaded from the application marketplace or storefront. The mobile device may also include or have access to a database 260.

The dynamic application 250 may include platform user interface (UI) code 251 that is operable to generate user interfaces in a native visual style of the mobile operating system 210. Exemplary native visual styles are further illustrated in FIG. 6. The dynamic application 250 may also include a layout manager 252 to arrange UI elements of the dynamic application 250, an object handler 253 to manage objects used by the dynamic application 250, and a native code bridge 254 to bridge between platform-agnostic code (e.g., at the web servers 281-285) and platform-specific code of the mobile operating system 210.

Figure 6:
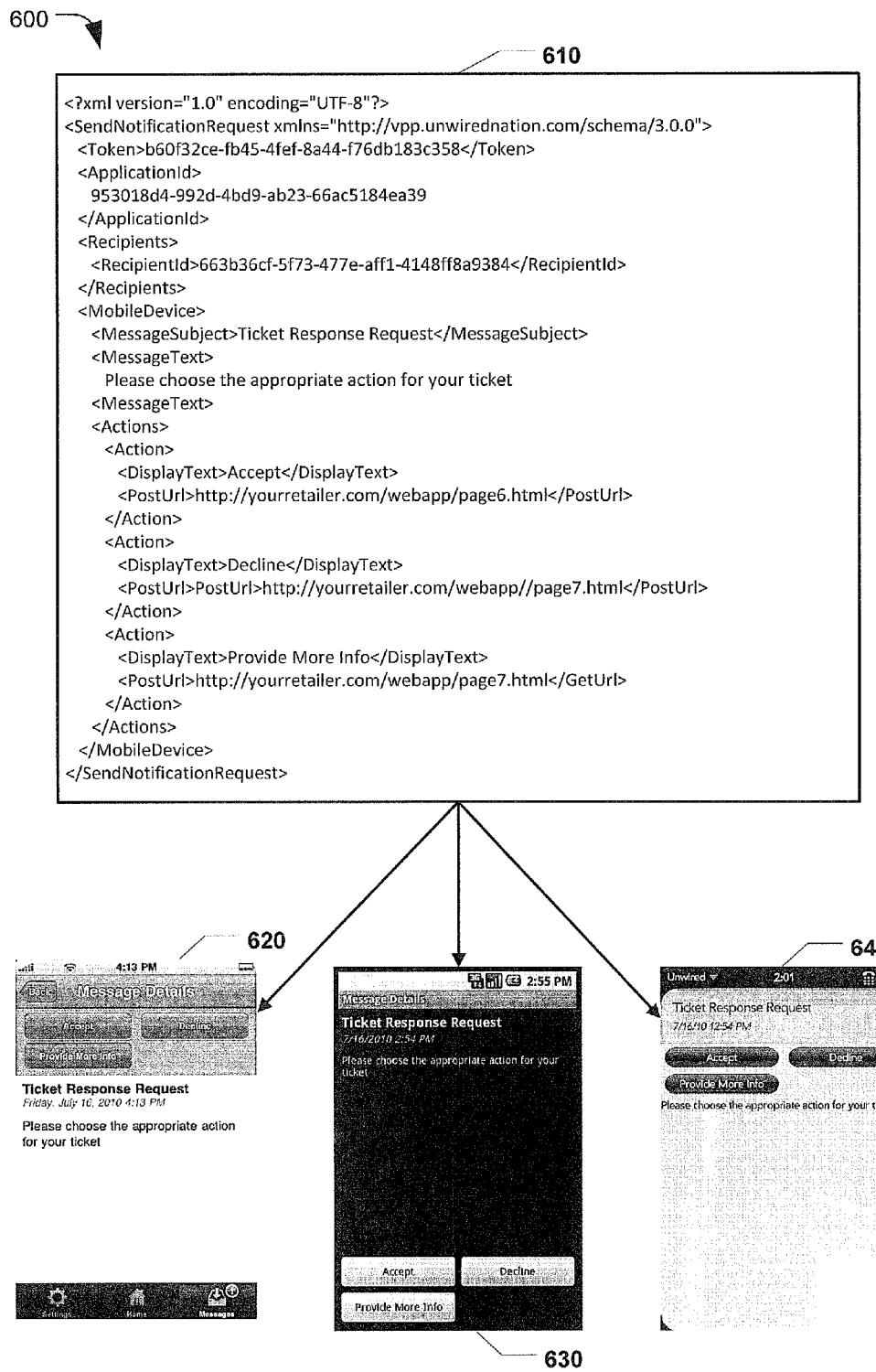
FIG. 6 is a diagram to illustrate a particular embodiment of a message rendered in native visual styles of various mobile devices.

During operation, the Customer A web server 281 (e.g., the Customer A web server 141 of FIG. 1) may issue a push message to each mobile device that has installed one of Customer A's PaaS-powered customized mobile applications. The Customer A web server 281 may transmit a request to the application service 270, where the request includes the UID associated with each target mobile device. Although the target mobile devices may have different device types, the request may advantageously be independent of the device types. For example, the request may be a platform-agnostic extensible markup language (XML) request, as illustrated in FIG. 6.

The application service 270 may receive the request and may send the message to each target mobile device. The dynamic application 250 at each of the mobile devices may display the message in a native visual style of the mobile devices, as illustrated in FIG. 6. Displaying the message at a mobile device in a corresponding native visual style may provide an aesthetically pleasing and seamless user experience. In a particular embodiment, the message may include at least one user interface control (e.g., button control) that is to be rendered in the native visual styles. The control may be operable to access a specific web application, function, or URL hosted at the Customer A web server 281. Alternatively, or in addition, the control may be operable to access a native device function of the mobile device. For example, native device functions may include a camera function, a global positioning system (GPS) function, a telephone function, a messaging function, an electronic mail function, a social networking function, a file management function, an application function, a contacts browsing function, a multimedia function, or any combination thereof. Button controls rendered in multiple native visual styles are illustrated in FIG. 6. The Customer A web server 281 may also detect that the message has been successfully delivered to the target mobile devices. For example, the Customer A web server 281 may receive a delivery confirmation from the application service 270 or may detect that the mobile devices accessed a web application hosted at the Customer A web server 281 via a button control included in the message.

It will be appreciated that a workflow to provide mobile applications in accordance with the systems 100 and 200 of FIGS. 1 and 2 may be as follows. A customer may license or subscribe to the mobile application technology provided by a PaaS provider. The customer may then create customized CSS definitions for their pre-existing web applications. For example, the customized CSS definitions may be created to be touchscreen compatible. Branding information and application integration data (e.g., uniform resource locators (URLs), images, and text) may be collected and combined with application code for each target mobile platform, and PaaS-powered customized mobile applications (e.g., the host application 240 and/or the dynamic application 250) may be compiled and listed for sale at mobile application marketplaces. Users interested in accessing the customer's mobile offerings may download and install the appropriate platform-specific customized mobile application to their mobile device. When the customized mobile application is executed for the first time, a user may provide sign-in information, which is used to create and store a UID. In general, the UID may be called to message the user on any registered device of the user.

Each time the user executes the customized mobile application on his or her mobile device, the UID and device type information may be provided to the customer's web server via a web service call-back. The customer's web server may recognize the UID and device information, and may directly serve (i.e., without intervention from the configuration service 120 of FIG. 1 or the application service 270 of FIG. 2) an appropriate user interface to the mobile device based on the UID and device type information. Interactions and communications between the customer web server and the mobile device may occur via secure socket layer (SSL) or some other security protocol.

The customer's website, web application, or business logic may determine that a message should be pushed to the user. For example, the message may include marketing information, account status information, a request for user approval, or other information. To send the message, the customer may make an API call to the application service 270 of FIG. 2, and the user's UID and the message to be pushed are provided as part of the API call. The application service 270 of FIG. 2 may push the message to each mobile device of the user that is registered on the UID. In addition, legacy devices and devices that are not push-enabled may poll for notification updates from the application service 270 of FIG. 2. The message may optionally include button controls that are rendered in the native visual style of the user's mobile device. The button controls may link back to various web assets or information located at the customer's web server, may post dynamic or pre-loaded data to a specific URL, or may trigger native functions of the mobile device.

It will be appreciated that push messages and button controls enabled by the systems of FIG. 1 and FIG. 2, when combined with existing back-end business logic of the customer, may enable a broad range of application interaction with end users on different mobile platforms, without requiring extensive modification to pre-existing web applications while maintaining the look and feel of each platform's native visual style.

The dynamic application 250 may enable PaaS customers to define interactive applications dynamically for each user independently of screen layout and GUI functions per device. The remote mobile code at each mobile device may be pre-configured with native UI, device functionality, and interactive capabilities. Customers may reconfigure these functionally within the pre-defined UI parameters via a web-services API of the PaaS provider. It should be noted that this functionality may not be limited to pre-defined UI parameters. For example, these elements may be dynamically delivered via XML and displayed at the mobile device within an embedded browser.

Figure 3:
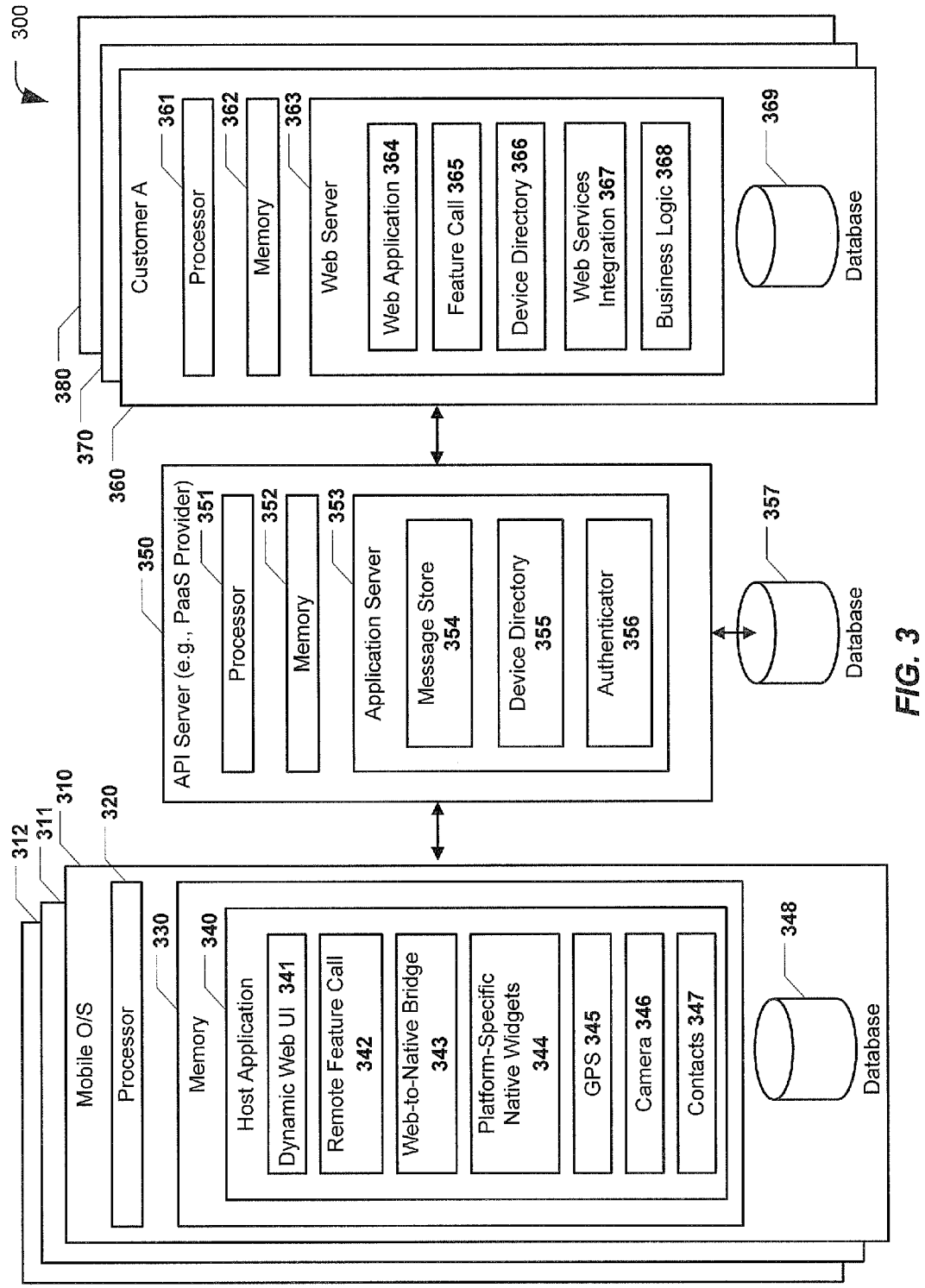
FIG. 3 is a diagram to illustrate another particular embodiment of a system to provide mobile applications to multiple mobile platforms.

In a particular embodiment, a customer may also insert specially-interpreted tags into their pre-existing web applications to enable particular mobile device functionality. FIG. 3 is a diagram to illustrate another particular embodiment of a system 300 to provide mobile applications to multiple mobile platforms on the basis of such tags. In an illustrative embodiment, the tags may be javascript tags inserted into one or more hypertext markup language (HTML) webpages. When interpreted, the tags may call "hidden" features built into PaaS-powered customized mobile applications if and when a customer decides to support such features. The system 300 of FIG. 3 may thus provide native device access to non-native applications such as the customer's platform-agnostic web applications.

For example, a mobile operating system 310 may execute on a mobile device that includes a processor 320 and a memory 330. The mobile device may be operable to execute a customized mobile application that accesses a web application or website at a computer system, such as Customer A's computer system 360 that includes a processor 361 and a memory 362. Similarly, mobile devices running alternate operating systems 311-312 may access the Customer A computer system 360 and other computer systems 370-380.

For example, the customized mobile application may include a host application 340. The host application 340 may include a dynamic web UI 341 (e.g., corresponding to a web application 364 hosted by a web server 363). The host application 340 may also include a remote feature call 342 that can be activated by a feature call 365 at the web server 363. For example, the feature call 365 may be implemented as a javascript tag to an HTML UI element of the web application 364. When interpreted at the host application 340, the feature call 365 may activate the remote feature call 342, which is routed to a native device function of the mobile device (e.g., an illustrative GPS function 345, camera function 346, or contacts browsing function 348) via web-to-native bridge code 343.

The host application 340 may also include one or more platform-specific native widgets 344 and may have access to a database 348. The web server 363 may include a device directory 366, a web services integration module 367, and business logic 368, and may have access to a database 369.

In a particular embodiment, the mobile devices and computer systems are communicatively coupled via an API server 350. For example, the API server 350 may include a processor 351, a memory 352, and an application server 353. The application server 353 may include a message store 354 (e.g., the message store 274 of FIG. 2), a device directory 355 (e.g., the device directory 275 of FIG. 2), an authenticator 356 (e.g., the authenticator 276 of FIG. 2), and logic to access a database 357. The API server 350 may be used to send push messages to mobile devices, as described with reference to FIG. 2.

During operation, the host application 340 may access a webpage (e.g., as part of the web application 364) and identify a mobile application tag (e.g., the javascript feature call 365) in the webpage. The mobile application tag may be platform—agnostic and independent of the device type of the mobile device. The remote feature call 342 may determine that the feature call 365 corresponds to a native device function of the mobile device and may access the native device function (e.g., the GPS function 345, the camera function 346, the contacts browsing function 347, or some other function). To illustrate, the feature call 365 may enable a user to take and upload a photo, obtain a GPS location, share content via short message service (SMS), or stream audio/video content. It will be appreciated that such features may not be possible when a mobile device accesses the web application 364 from outside the host application 340.

It will also be appreciated that the system 300 of FIG. 3 may implement such functionality without compiling the web application 364 and associated HTML into the host application 340 and without hosting the web application 364 at an intermediary server (e.g., the API server 350 of FIG. 3). It will further be appreciated that to implement the feature call functionality, customers may not have to deploy mobile applications themselves or create native binaries that translate between HTML, javascript, and native code of a particular platform. Instead, the system 300 of FIG. 3 may operate without translating between HTML, javascript, and native code of a mobile device.

In addition, the association between the web application 364 and the native device functions at the mobile device may be dynamic, and the customer may turn on, turn off, or modify the feature call 365 at any time, without needing the user to update or reinstall the host application 340. The customer may also publish new functions without having to wait for end-user (e.g., mobile device owner) interaction or application store approval, and the feature call 365 may be "invisible" to clients other than the host application 340 (e.g., existing laptop or desktop clients). The system 300 of FIG. 3 may thus provide PaaS capabilities and shorten an application development and feature deployment cycle. For example, a customer may dynamically add, remove, and edit web application functionality on a desired schedule that and rely on the PaaS provider to simultaneously deploy the functionality to various mobile platforms.

The PaaS systems and methods disclosed herein may thus enable efficient configuration, customization, and distribution of multiple branded applications for multiple customers and resellers with one codeset per platform. Configuration and customization may be performed prior to deploying the PaaS-powered mobile applications to application stores, remotely by the customer after the PaaS-powered application has been deployed to application stores, by the PaaS provider, or any combination thereof.

Figure 4:
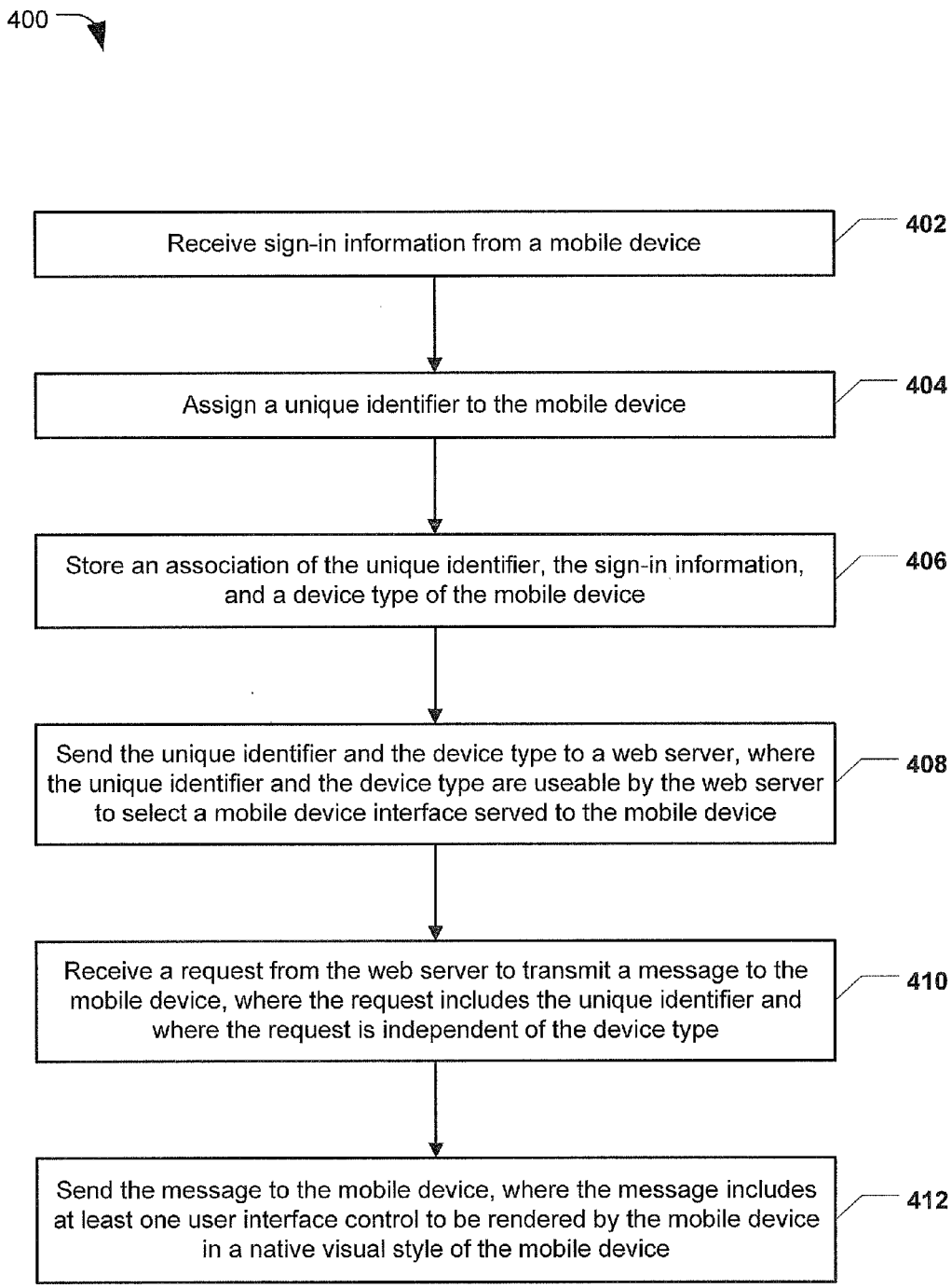
FIG. 4 is a flow diagram to illustrate a particular embodiment of a method of providing mobile applications to multiple mobile platforms.

FIG. 4 is a flow diagram to illustrate a particular embodiment of a method 400 of providing mobile applications to multiple mobile platforms. In an illustrative embodiment, the method 400 may be performed at the system 100 of FIG. 1.

The method 400 may include receiving sign-in information from a mobile device, at 402, and assigning a unique identifier to the mobile device, at 404. For example, in FIG. 1, the configuration server 120 may receive sign-in information from the mobile device 102 and may assign a unique identifier to the mobile device 102.

The method 400 may also include storing an association of the unique identifier, the sign-in information, and a device type of the mobile device, at 406. For example, in FIG. 1, the association may be stored in the database 127 accessible to the matching service 123.

The method 400 may further include sending the unique identifier and the device type to a web server, at 408. The unique identifier and the device type may be useable by the web server to select a mobile device interface served to the mobile device. For example, in FIG. 1, the configuration server 120 may send the unique identifier and the device type to the web server 141, and the web server 141 may provide the mobile device 102 a device-specific interface that is operable to access web application functionality at the web server 141.

The method 400 may include receiving a request from the web server to transmit a message to the mobile device, at 410. The request may include the unique identifier and may be independent of the device type. For example, in FIG. 1, the web server 141 may issue a platform-agnostic request to push a message to the mobile device 102.

The method 400 may also include sending the message to the mobile device, at 412. In a particular embodiment, the message may include at least one user interface control to be rendered by the mobile device in a native visual style of the mobile device. For example, in FIG. 1, the message may be sent to the mobile device 102 and may be rendered by the mobile device 102 in its native visual style. An illustrative embodiment of push messaging is described with reference to FIG. 2, and an illustrative embodiment of rendering a message in a native visual style is described with reference to FIG. 6.

Figure 5:
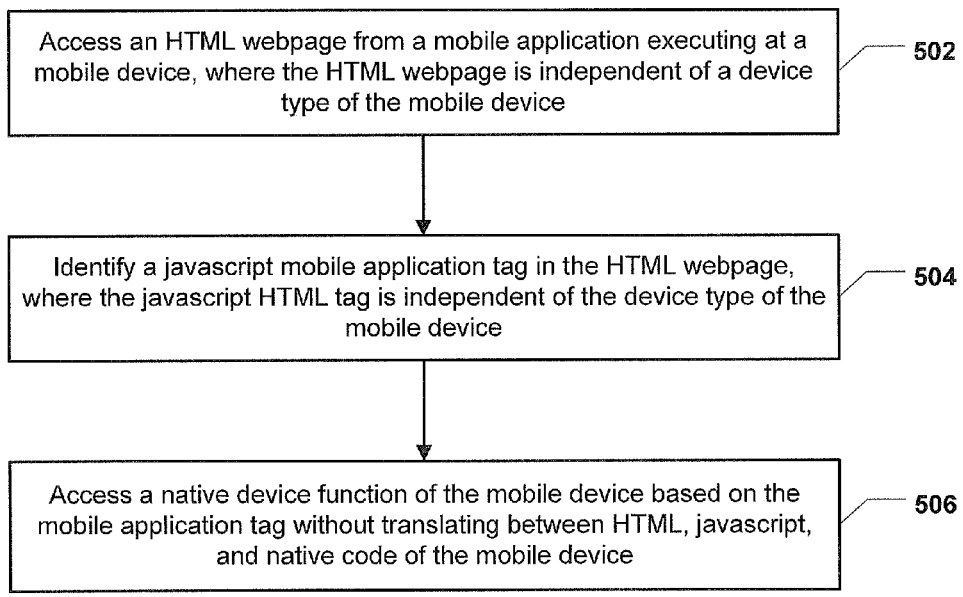
FIG. 5 is a flow diagram to illustrate another particular embodiment of a method of providing mobile applications to multiple mobile platforms.

FIG. 5 is a flow diagram to illustrate another particular embodiment of a method 500 of providing mobile applications to multiple mobile platforms. In an illustrative embodiment, the method 500 may be performed at a mobile device executing the mobile operating system 310 of FIG. 3.

The method 500 may include accessing an HTML webpage from a mobile application executing at a mobile device, at 502. The HTML webpage may be independent of a device type of the mobile device and may be located at a customer web server. For example, in FIG. 3, the host application 340 at the mobile device may access the web application 364.

The method 500 may also include identifying a javascript mobile application tag in the HTML webpage at 504. The javascript tag may be independent of the device type of the mobile device, at 504. For example, in FIG. 3, the web application 364 may include the feature call 365, where the feature call 365 is a javascript tag.

The method 500 may further include accessing a native device function of the mobile device based on the mobile application tag without translating between HTML, javascript, and native code of the mobile device, at 506. To illustrate, the web application 364 and the javascript tags therein may be compiled by the customer without the inclusion of native binaries that translate to platform-specific code, and the mapping between the tags and the native device functions may occur exclusively within the PaaS-powered application. For example, in FIG. 3, the remote feature call 342 at the mobile device may access the GPS function 345, the camera function 346, or the contacts browsing function 347 at the mobile device.

FIG. 6 is a diagram to illustrate a particular embodiment of a message 610 rendered in native visual styles 620, 630, 640 of various mobile devices. In the embodiment illustrated in FIG. 6, the message 610 is represented in extensible markup language (XML). However, it should be noted that XML is described for illustration only. The message 610 may alternately be represented in any other format.

The message 610 may include controls or links to web applications or to native mobile device functions. For example, in the embodiment in FIG. 6, the message includes three "Actions": "Accept," "Decline," and "Provide More Info," where each "Action" links to a webpage of a web application hosted at http://yourretailer.com/webapp/.

When received by mobile devices, the message 610 may be rendered in the native visual style (e.g., color scheme, fonts, shapes, and layout) of the mobile device. Rendering the message in the native visual style may provide an aesthetically pleasing and seamless user experience at the mobile device. For example, the message 610 may be rendered in a first native visual style 620, a second native visual style 630, and a third native visual style 640, where the native visual styles 620-640 utilize different color schemes, fonts, button shapes, and layouts.

In a particular embodiment, the systems and methods disclosed herein may be implemented by one or more PaaS web services that are accessible to user mobile devices, customer systems, or both. For example, a PaaS provider may implement a mobile configuration service, a dynamic application service, and a decentralized native service in accordance with the techniques disclosed herein, and may offer access to such services for a fee (e.g., on a subscription basis).

The mobile configuration service may function as a directory service that maps mobile device information to UIDs. The mobile configuration service may also enable remote changes to application URLs after a customized mobile application has been installed at a mobile device. For example, changes to call-backs, registration, and default homepage URLs may be made. The mobile configuration service may also serve to abstract users from applications, customers, networks, and devices while implementing a transparent pass-through authentication scheme.

The dynamic application service may provide a platform-specific UI for presentation of dynamic application experiences. The dynamic application service may also enable dynamic definition of objects and contextual engagement (e.g., based on time, geographic location, and other dynamic business logic). The dynamic application service may implement objects that perform displaying, data posting, and pop-up options, and such objects may be locally or remotely linked at runtime.

The decentralized native service may abstract native mobile services via methods such as javascript and URL encoding, bundle native services within platform-specific code, and allow remote invocation/control of native services at runtime. The decentralized native service may also implement a remote UI executed at runtime, such that a single platform-specific binary supports multiple runtime configurations.

In accordance with various embodiments of the present disclosure, the methods described herein may be implemented by software programs executable by a computer system. Further, in an exemplary embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer based functions disclosed herein. The computer system may be connected, e.g., using a network, to other computer systems or peripheral devices. For example, the general computer system or components thereof can include or be included within any one or more of the mobile devices 102-106 of FIG. 1, the configuration server 120 of FIG. 1, the web servers 141-145 of FIG. 1, the mobile devices corresponding to the mobile operating systems 210-212 of FIG. 2, the application service 270 of FIG. 2, the web servers 281-285 of FIG. 2, the mobile devices corresponding to the mobile operating systems 310-312 of FIG. 3, the API server 350 of FIG. 3, the computer systems 360, 370, 380 of FIG. 3, or any combination thereof. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
receiving sign-in information from a mobile device;
assigning a unique identifier to the mobile device;
storing an association of the unique identifier, the sign-in information, and a device type of the mobile device;
receiving a request from a web server to transmit a message to the mobile device, wherein the request includes the unique identifier associated with the mobile device, and wherein the request is independent of the device type of the mobile device; and
sending the message to the mobile device.

2. The method of claim 1, further comprising sending the unique identifier and the device type to the web server, wherein the unique identifier and the device type are usable by the web server to select a mobile website interface served to the mobile device.

3. The method of claim 1, wherein the mobile device displays the message in a native visual style of the mobile device.

4. The method of claim 3, wherein the message includes at least one user interface control to be rendered by the mobile device in the native visual style of the mobile device.

5. The method of claim 4, wherein the user interface control is operable to access a web application hosted at the web server.

6. The method of claim 4, wherein the user interface control is operable to access a native device function of the mobile device.

7. The method of claim 6, wherein the native device function comprises a camera function.

8. The method of claim 6, wherein the native device function comprises a global positioning system (GPS) function.

9. The method of claim 6, wherein the native device function comprises a telephone function, a messaging function, a contacts browsing function, an electronic mail function, a social networking function, a file management function, an application function, a multimedia function, or any combination thereof.

10. The method of claim 4, wherein the user interface control comprises a button control.

11. The method of claim 1, wherein the mobile device comprises a mobile telephone, a smartphone, a touchscreen computing device, a portable media player, or any combination thereof.

12. The method of claim 1, wherein the mobile device is a particular mobile device of a plurality of mobile devices of the device type.

13. The method of claim 12, wherein the message is transmitted to the mobile device based on the unique identifier.

14. The method of claim 1, further comprising:
receiving a second request from a second web server to transmit a second message to the mobile device, wherein the second request includes the unique identifier associated with the mobile device, and wherein the request is independent of the device type of the mobile device; and
sending the second message to the mobile device.

15. A computer system comprising:
a processor; and
a memory coupled to the processor, the memory storing instructions executable by the processor to:
receive a unique identifier and a device type associated with a mobile device from a second computer system;
send a request to the second computer system to transmit a message to the mobile device, wherein the request includes the unique identifier, and wherein the request is independent of the device type of the mobile device; and detect that the message is delivered to the mobile device.

16. The computer system of claim 15, wherein the instructions are further executable by the processor to select a mobile website interface to transmit to the mobile device based on the unique identifier and the device type, wherein the mobile website interface is operable to access a web application hosted at the computer system, wherein the mobile website interface is generated based on a layout definition of the web application, and wherein the layout definition corresponds to the device type of the mobile device.

17. The computer system of claim 16, wherein the message further includes a user interface control operable at the mobile device to access the web application.

18. The computer system of claim 17, wherein detecting that the message is delivered to the mobile device includes detecting that the mobile device accessed the web application via the control.

19. The computer system of claim 15, wherein the message further includes a user interface control operable at the mobile device to access a native device function of the mobile device.

20. The computer system of claim 15, wherein the mobile device is a particular mobile device of a plurality of mobile devices of the device type.

* * * * *